Feb. 2, 1926.
T. H. LINK
1,571,677
HAND BRAKE
Filed March 14, 1924
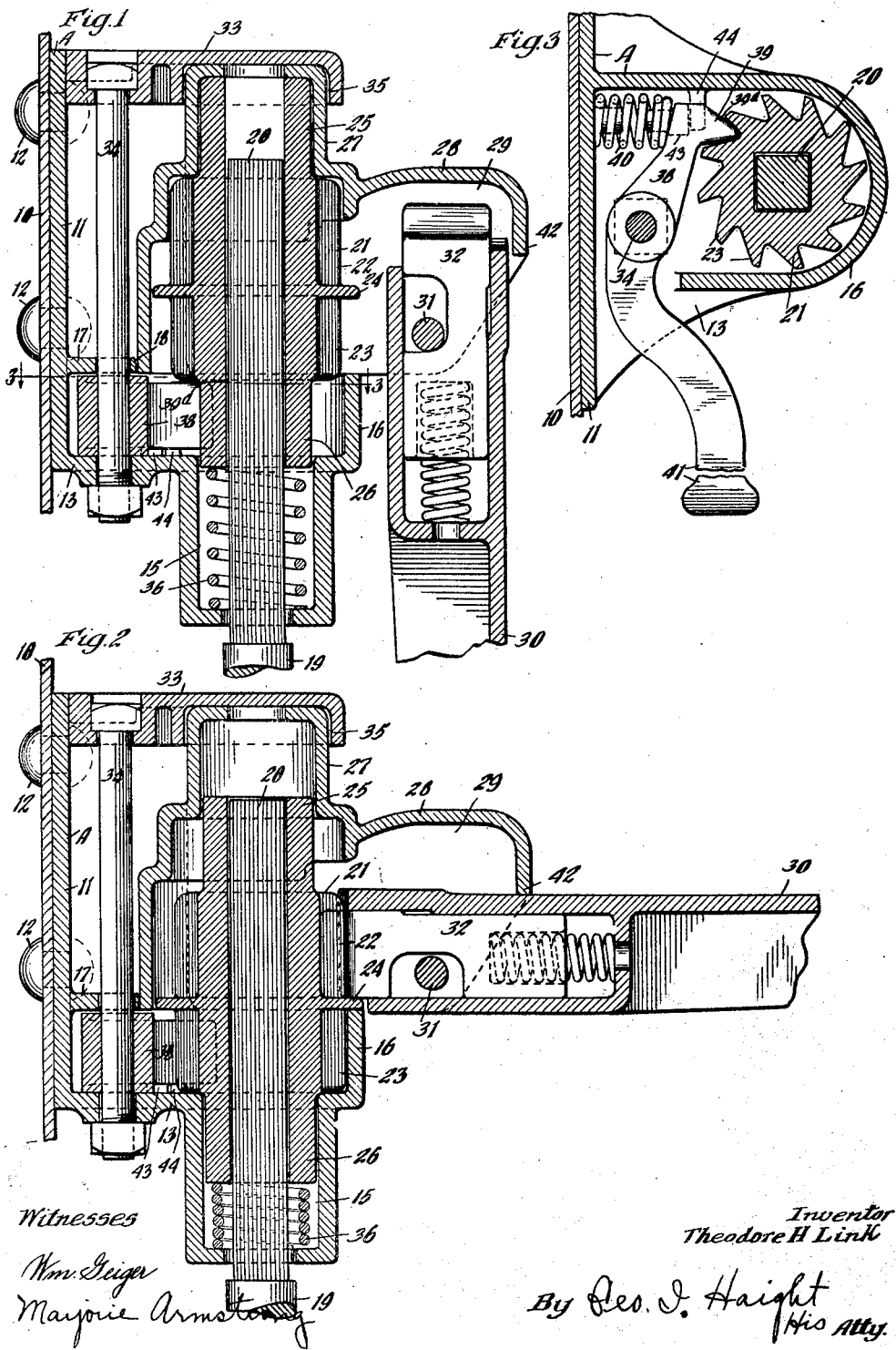
Witnesses
Wm. Geiger
Marjorie Armstrong
Inventor
Theodore H Link
By Geo. I. Haight
His Atty.

Patented Feb. 2, 1926.

1,571,677

UNITED STATES PATENT OFFICE.

THEODORE H. LINK, OF CHICAGO, ILLINOIS, ASSIGNOR, BY MESNE ASSIGNMENTS, TO W. H. MINER, INC., A CORPORATION OF DELAWARE.

HAND BRAKE.

Application filed March 14, 1924. Serial No. 699,181.

*To all whom it may concern:*

Be it known that I, THEODORE H. LINK, a citizen of the United States, residing at Chicago, in the county of Cook and State of Illinois, have invented a certain new and useful Improvement in Hand Brakes, of which the following is a full, clear, concise, and exact description, reference being had to the accompanying drawings, forming a part of this specification.

This invention relates to improvements in hand brakes.

In the present railroad practice, the use of hand brakes involving a ratchet mechanism is becoming more and more common. In this type of ratchet hand brake, it is customary to associate with the ratchet wheel, a spring or gravity controlled locking dog to prevent accidental reverse rotation of the brake staff during the application of the brakes. To release the brakes, the brakeman disengages the pawl or dog, whereupon the staff is unwound suddenly and the brakeman then releases the pawl and the latter assumes its engagement with the ratchet wheel. Experience has demonstrated that, while the brakes release as above indicated, nevertheless, it very frequently happens that there is sufficient binding on the brake staff to prevent the latter from turning freely toward the end of the release action and after the tension has been removed and the momentum under the release action dissipated, with the result that complete slack in the chains running to the brake rigging is not assured. This results in the brake shoes dragging to a certain extent on the wheels as the car is continued in service and until the brakes are again applied. Obviously, this produces rapid and excessive wear of the shoes. Were the staff left free to rotate still farther than the normal release action, the vibration and swinging of the brake chain and other associated parts as soon as the car is started in motion would be sufficient to still farther unwind the chain from the staff and assure complete disengagement of the brake shoes from the wheels when the car has been run just a short distance.

The object of my invention is to provide, in a hand brake of the type indicated, means for automatically rendering inoperative any engagement between the ratchet wheel and the usual locking dog or pawl after the brake has been released in the usual manner so as to positively insure the brake staff being left entirely free to rotate until the brake is again set and thereby insure the brake shoes becoming fully disengaged from the wheels and hence minimize wear of the shoes.

Other objects and advantages of the invention will more clearly appear from the description and claims hereinafter following.

In the drawing forming a part of this specification, Figure 1 shows a vertical sectional view of a hand brake embodying my improvements with the parts in full release. Figure 2 shows a vertical sectional view of the device with the parts in operative position. And Figure 3 shows a horizontal sectional view taken substantially on the line 3—3 of Figure 1.

In said drawing, 10 denotes the end wall of the car, to which is secured a housing or bracket designated generally by the reference character A. The latter is formed with a back wall 11, secured by rivets 12 to the end wall 10 of the car, and with a horizontally extending web 13 formed with a vertically upwardly extending circular wall or web 16. A socket 15 depends from the web 13 as shown in the drawings, and said bracket is also provided with a horizontally extending web 17 located above the web 13 and having a curved edge or face 18.

The usual vertical brake staff is indicated at 19, it being understood that the same will have a chain-winding means at its lower end so as to receive a chain connecting with and leading to the brake rigging, said brake staff being provided at its upper end with a portion 20 of substantially square section.

A ratchet member 21, having an upper and a lower set of teeth, 22 and 23 respectively, separated by a centrally located annular or radial flange 24, is nonrotatably mounted upon the square portion 20 of the brake staff so as to be slidable longitudinally thereof and drive the same. The upper and lower ends of the ratchet are reduced in diameter as at 25 and 26 respectively, so that the end 25 may loosely fit into a guide portion 27 of a rotatable carrier member 28, the other end 26 loosely fitting into the socket portion 15. By this construction, the staff may be rotated in unison with the ratchet member, while permitting the ratchet member to be slid longitudinally of said shaft to operative or inoperative position, as will be hereinafter described.

The carrier member 28 is of generally circular outline, in horizontal section, and surrounds the ratchet member 21, having bearing on the upper edge of the circular portion 16 of the bracket. The carrier member is provided with spaced side walls 29 connected by a horizontally and downwardly extending part 42, the operating lever 30 being pivotally mounted therebetween on a bolt 31 extending through said walls.

The lever 30 is of well-known construction and is provided with a spring-pressed pawl 32, adapted to engage with the upper set of ratchet teeth 22.

The upper end portion of the housing or bracket A is closed by a top cover plate 33 held in position by a vertically extending bolt 34 passing through alined recesses in the cover plate 33, the web 17 and the web 13. On its lower or under face, the cover plate 33 is provided with a shallow recess 35, in alinement with the reduced guide portion 27 of the carrier 28 so as to receive the same.

A coil spring 36 is interposed between the bottom of the socket portion 15 and the reduced end portion of the ratchet, said spring surrounding the brake staff and pressing upwardly, normally maintaining the ratchet member in its uppermost position against the upper end of the carrier member 28.

A locking dog or holding pawl 38 is pivoted upon the bolt 34 so as to swing in a horizontal plane between the webs 17 and 13, and has a pointed or toothed end 39 adapted to coact with the lower set of ratchet teeth 23, to prevent backward or retrograde movement of said ratchet member. Said tooth 39 has its upper surface rounded or beveled as indicated at 39ᵃ to insure its proper meshing with the ratchet teeth 23 when the ratchet member is depressed as hereinafter described. The end 39 of the dog is yieldingly held in engagement with the ratchet member by a spring 40, and the opposite end of said dog is provided with an extension or hand lever 41 by which the same may be manipulated to trip, disengage, or release the dog from the ratchet member to release the brakes.

In order to hold the dog from going beyond its ratchet-engaging position when the ratchet is lifted, the tooth 39 is provided with a lug 43 engageable against a cooperating stop or lug 44 formed on the web 13.

In the operation of my improved hand brake, assuming that the ratchet member is at its normal uppermost or inoperative position, the lever 30 is raised or swung from the position shown in Figure 1 to that shown in Figure 2, whereupon its spring-pressed pawl 32 will engage against the annular flange 24 of the ratchet member, moving the ratchet member downwardly longitudinally on the brake staff, against the tension of the spring 36, and into operative position, the downward movement of the ratchet member being limited by the flange 24 engaging against the circular top edge of the circular wall portion 16 of the bracket as shown in Figure 2, so that said top edge of the portion 16 forms a stop and a bearing surface. At this point it is also to be noted that pivotal movement of the lever 30 to horizontal position is limited by engaging against the under edge of the part 42 of the carrier member 28, thus forming a stop. Upon oscillating the lever 30, the ratchet member will be intermittently rotated, and through the engagement of the upper square end of the brake staff will rotate or drive the latter to wind the brake chain, the dog 38 coacting with the set of teeth 23 to lock or hold the ratchet member in its operative position while the lever 30 is intermittently rotated.

When the brakes are set, the lever 30 may then be released from the ratchet member and the locking pawl will hold the ratchet member in operative position, since the friction produced by the torsional strain between the staff and ratchet member is great enough to prevent the expansion of the spring 36 if the ratchet member is held by the locking dog 38.

To release the brake, the brakeman pulls on the lever 41 of the locking dog to disengage the latter from the ratchet wheel, whereupon the brake staff will spin in an unwinding direction sufficiently to release the brakes. This takes place almost instantaneously in actual practice and as soon as the spinning action has ceased and before the brakeman releases his hold upon the dog lever 41, the spring 36 expands and lifts the ratchet wheel to its uppermost position above the plane of the locking dog, so that, when the latter is released by the brakeman, it does not engage with the ratchet wheel. This leaves the brake staff free to rotate still farther in an unwinding direction, which will automatically take place when the car is again placed in motion, due to the rattling and surging and swinging of the brake chain, and associated parts, which will exert temporary pulls upon the staff to unwind it still farther and thereby positively insure clearance of the brake shoes from the wheels.

Should the spring 36 become broken through any accident or mishap, the brake will operate the same as the brakes of usual construction, in which the locking dog is always in engagement with the set of ratchet teeth 23.

I have herein shown and described what

I now consider the preferred manner of carrying out my invention but the same is merely illustrative and I contemplate all changes and modifications that come within the scope of the claims appended hereto.

I claim:

1. In a hand brake for railway cars, the combination with a brake staff; of a ratchet member movably connected thereto and normally held in inoperative position to permit free unwinding of said staff; a holding pawl adjacent said member to coact therewith when the latter is in operative position; and an operating lever coacting with said ratchet member and arranged to move it into operative position.

2. In a hand brake for railway cars, the combination with a brake staff; of a ratchet member slidably but non-rotatably mounted thereon; a holding pawl pivoted adjacent said member to coact therewith only when the latter is in operative position, said pawl being operable to release said ratchet member when in operative position; and an operating lever normally out of driving engagement with said ratchet member, but movable thereinto to slide the latter into operative position relative to said holding pawl.

3. In a hand brake for railway cars, the combination with a brake staff; of a ratchet member slidably connected thereto for driving the same; a releasable holding pawl adjacent said member to coact therewith when the latter is in operative position; means for normally maintaining said member in inoperative position; and an operating lever coacting with said ratchet member and arranged to move it into operative position when the former is moved into its operative position, said lever being normally free of said ratchet member.

4. In a hand brake for railway cars, the combination with a brake staff; of a ratchet member movably connected thereto and having a pair of sets of ratchet teeth; a holding pawl adapted to coact with one of said sets of teeth only when the ratchet is in operative position, said ratchet member being normally in inoperative position relative to said holding pawl; and an operating lever normally free of said ratchet wheel and adapted to co-act with the other set of teeth when moved into operative position and moving said ratchet member into position so that the holding pawl may coact with the cooperating ratchet teeth.

5. In a hand brake for railway cars, the combination with a brake staff; of a ratchet member movably connected thereto; a holding pawl adjacent said member to coact therewith only when the latter is in operative position; an operating lever coacting with said ratchet member and arranged to move it into operative position, said lever and pawl being independently releasable; and spring means for automatically retracting said member to its inoperative position when said lever and pawl are released.

6. In a hand brake for railway cars, the combination with a brake staff; of a ratchet member slidable thereon for rotating the same; a bracket supporting said ratchet member; a spring normally maintaining said ratchet member in its inoperative position; a carrier pivotally supported on said bracket; and a hand lever pivotally mounted on said carrier and movable into operative position to engage said ratchet member and slide the latter into operative position against the action of said spring, said carrier being provided with a stop to engage said lever to limit said last-mentioned sliding movement of said ratchet member.

7. In a device of the kind described, the combination with a brake staff; of a ratchet member drivingly connected thereto and slidable longitudinally thereon; a supporting bracket; a hand lever movable into operative engagement with said member; a locking dog engageable with said member; a spring for normally maintaining said member out of the path of movement of said dog; and inter-engaging means between said member and lever to slide the former into position to be engaged by said dog when said lever is moved into operative position, said dog and lever being independently releasable.

8. In a device of the kind described, the combination with a brake staff; of a ratchet member drivingly connected thereto and slidable longitudinally thereon; a supporting bracket; a hand lever normally free of engagement and movable into operative engagement with said ratchet member; a holding pawl engageable with said member; a spring for normally maintaining said ratchet member beyond the path of movement of said pawl; and means on said member adapted to be engaged by said lever to move said member into the path of movement of said pawl when the lever is moved into operative position.

9. In a hand brake, the combination with a brake staff; of a ratchet member drivingly connected thereto and slidable longitudinally thereon; a supporting bracket having a socket at its lower end to receive the lower end of said ratchet member; a hand lever movable into operative position to coact with said ratchet member; a holding pawl engageable with said member; a spring in said socket pressing upwardly against said ratchet member for normally maintaining the latter above the plane of movement of said pawl; and a radial flange on said ratchet member, adapted to be engaged by said lever when the latter is moved into operative position, to move said member into position to coact with said locking pawl.

10. In a device of the kind described, the combination with a brake staff; of a ratchet member drivingly connected thereto and slidable longitudinally thereon; a supporting bracket having a socket to receive an end of said ratchet member; a hand lever movable into operative position to rotate said ratchet member; a spring in said socket for normally maintaining said member in its uppermost position; and a radial flange on said ratchet member intermediate its ends, and adapted to be engaged by the hand lever when moving the latter to operative position, thereby moving said ratchet member downwardly into engagement with said pawl, said bracket having a portion forming a stop for limiting the downward movement of said ratchet.

11. In a hand brake for railway cars and the like, the combination with a rotatable element for effecting tightening of the brake chain and which is subject to the pull of the brake chain; of a member having operative driving connection with said element and arranged to change position with respect thereto; manually operable means, normally inoperative with respect to said member arranged to cooperate with said member for effecting step by step rotation thereof in one direction; means automatically cooperable with said member to prevent reverse rotation of the latter during the application of the brake and while said member is subject to torsional stress; and means for rendering the relation of said member and said locking means inoperative automatically when the brake is released and said chain-tightening element has been rotated in the unwinding direction.

In witness that I claim the foregoing I have hereunto subscribed my name this 11th day of March 1924.

THEODORE H. LINK.